(12) United States Patent
Cho

(10) Patent No.: US 8,610,683 B2
(45) Date of Patent: Dec. 17, 2013

(54) TOUCH SCREEN PANEL

(75) Inventor: Sun-Haeng Cho, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 173 days.

(21) Appl. No.: 13/186,247

(22) Filed: Jul. 19, 2011

(65) Prior Publication Data

US 2012/0176323 A1    Jul. 12, 2012

(30) Foreign Application Priority Data

Jan. 7, 2011    (KR) .......................... 10-2011-0001812

(51) Int. Cl.
    *G06F 3/041*    (2006.01)
(52) U.S. Cl.
    USPC .......................................................... 345/173
(58) Field of Classification Search
    USPC .......................................... 345/173, 174, 175
    See application file for complete search history.

(56) References Cited

U.S. PATENT DOCUMENTS

| 8,283,567 B2 * | 10/2012 | Yoo et al. ...................... 174/254 |
| 2011/0242017 A1 * | 10/2011 | Kang et al. .................... 345/173 |
| 2012/0050114 A1 * | 3/2012 | Li et al. ......................... 343/702 |

FOREIGN PATENT DOCUMENTS

| KR | 10-2008-0110158 A | 12/2008 |
| KR | 10-0909265 B1 | 7/2009 |

* cited by examiner

*Primary Examiner* — Fred Tzeng
(74) *Attorney, Agent, or Firm* — Christie, Parker & Hale, LLP

(57) ABSTRACT

A touch screen panel according to an exemplary embodiment of the present invention includes: first and second substrates each being divided into a touch active region and a touch non-active region that is located outside the touch active region; second sensing electrodes at the touch active region on a first surface of the first substrate; first sensing electrodes divided into at least two groups respectively at the touch active regions on different surfaces of the first and second substrates, a group of the at least two groups being on a second surface of the first substrate or at least one surface of the second substrate; and outside wirings connected to the first and second sensing electrodes, the outside wirings and the sensing electrodes on a same one of the substrates being at a same plane.

14 Claims, 4 Drawing Sheets

TOUCH SCREEN PANEL

CROSS-REFERENCE TO RELATED APPLICATION

This application claims priority to and the benefit of Korean Patent Application No. 10-2011-0001812, filed on Jan. 7, 2011, in the Korean Intellectual Property Office, the entire content of which is incorporated herein by reference.

BACKGROUND

1. Field

Aspects of embodiments according to the present invention relate to a touch screen panel.

2. Description of the Related Art

A touch screen panel is an input device that selects instructions displayed on a screen (such as an image display device, etc.) using a person's hand or an object to input instructions from a user.

To this end and in one embodiment, the touch screen panel is provided on a front face of the image display device and converts positions that are directly touched by a person's hand or an object into electrical signals. Therefore, the instructions selected at the touched positions are received as the input signals.

As the touch screen panel can replace a separate input device, such as a keyboard or a mouse, that is operated by being connected with the image display device, the application field of the touch screen panel is being gradually expanded.

Types of the touch screen panel include a resistive type, a light sensing type, and a capacitive type, etc.

In the capacitive type touch screen panel, when the person's hand or the object touches the touch screen panel, the conductive sensing electrode senses the change in capacitance generated by adjacent sensing patterns or ground electrode, etc., thereby converting touched positions into the electrical signals.

The capacitive-type touch screen panel does not have a degradation of image quality problem that occurs in the resistive-type touch screen panel due to an air layer that exists between two transparent substrates on which upper electrodes and lower electrodes are formed.

In particular, when sensing electrodes provided on the capacitive-type touch screen panel are formed on a single film substrate, the capacitive-type touch screen panel may be implemented as a light and slim touch screen panel while providing the improved quality of image over the resistive-type touch screen panel.

However, in the case of the film-type touch screen panel according to the related art, all the sensing electrodes and the outside wirings connected thereto are formed on one surface of the film substrate, thereby increasing a dead space (black matrix region) in which the outside wirings are disposed, such that it is difficult to manufacture the film-type touch screen panel having high definition and large area.

SUMMARY

An aspect of an embodiment according to the present invention is directed toward a touch screen panel where sensing electrodes and outside wirings are formed in separate groups. An aspect of an embodiment according to the present invention is directed toward a touch screen panel capable of reducing a dead space region, e.g., by half, as compared to the related art, by separately forming first sensing electrodes and outside wirings connected to the first sensing electrodes on different surfaces of either two sheets of substrates or a sheet of substrate.

A touch screen panel according to an exemplary embodiment of the present invention includes: first and second substrates, each being divided into a touch active region and a touch non-active region that is located outside the touch active region; second sensing electrodes at the touch active region on a first surface of the first substrate; first sensing electrodes divided into at least two groups respectively at the touch active regions on different surfaces of the first and second substrates, a group of the at least two groups being on a second surface of the first substrate or at least one surface of the second substrate; and outside wirings connected to the first and second sensing electrodes, the outside wirings corresponding and connected to the sensing electrodes on a same one of the substrates being on a same plane.

A first group of the first sensing electrodes at a first region and a first group of the outside wirings that are connected to the first group of the first sensing electrodes may be on the second surface of the first substrate, and a second group of the first sensing electrodes at a second region and a second group of the outside wirings that are connected to the second group of the first sensing electrodes may be on one surface of the second substrate.

The one surface of the second substrate may be an outer side surface of the second substrate, and the one surface of the second substrate may be an inner side surface of the second substrate. The touch screen panel may further include a transparent ground electrode layer on an outer side surface of the second substrate opposite the inner side surface thereof.

The first group of the first sensing electrodes at the first region and the first group of the outside wirings that are connected to the first group of the first sensing electrodes may be on a first surface of the second substrate, and the second group of the first sensing electrodes at the second region and the second group of the outside wirings that are connected to the second group of the first sensing electrodes may be on a second surface of the second substrate.

The touch screen panel may further include a transparent adhesive between the second surface of the first substrate and a first surface of the second substrate to bond the first and second substrates to each other.

The outside wirings may include a transparent electrode layer and a plating film on the transparent electrode layer, and the first and second sensing electrodes may each include a transparent electrode layer that is at a same layer, and include a same material as the transparent electrode layer of the outside wirings.

The plating film may include at least one material selected from the group consisting of copper, nickel, gold, silver, palladium, and an alloy thereof.

The first sensing electrodes may be connected to one another in a plurality of line units in a first direction, and the second sensing electrodes may be connected to one another in a plurality of line units in a second direction, crossing with the first direction.

The first and second substrates may include a film substrate, and the film substrate may be a cyclo olefin polymer (COP) substrate.

A first group of the first sensing electrodes and a first group of the outside wirings that are connected to the first group of the first sensing electrodes may be at a first region, and the a second group of the first sensing electrodes and a second group of the outside wirings that are connected to the second group of the first sensing electrodes may be at a second region. Half of the first sensing electrodes and half of the outside wirings that are connected to the half of the first sensing electrodes may be at the first region, and the other half of the first sensing electrodes and the other half of the outside wirings that are connected to the other half of the first sensing electrodes may be at the second region.

As set forth above, in the exemplary embodiments of the present invention, the first sensing electrodes and the outside wirings, that are connected to the first sensing electrodes, are formed on different surfaces of either two sheets of substrates or a sheet of substrate to reduce the dead space, e.g., by half, as compared to the related art, while maintaining the interval between the outside wirings, thereby making it possible to realize a light and slim touch screen panel with high definition and a large display area.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
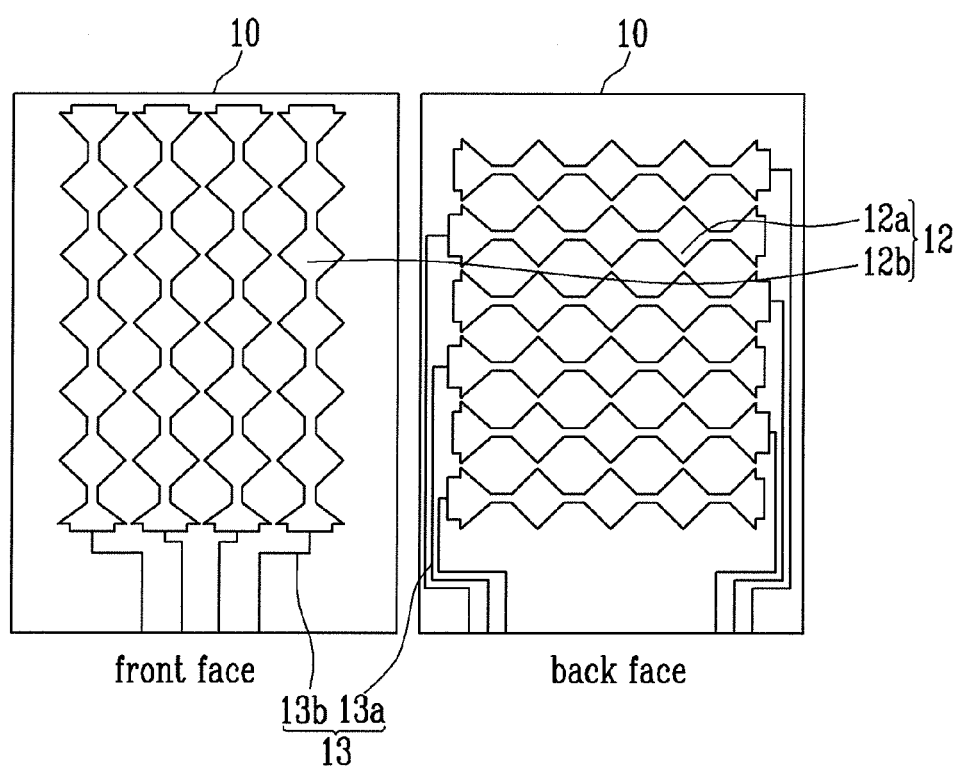
FIG. 1 is a schematic plan view showing a structure of a film-type touch screen panel.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, exemplary embodiments of the present invention will be described in more detail with reference to the accompanying drawings.

FIG. 1 is a schematic plan view showing a structure of a film-type touch screen panel with a front face and a back face.

Referring to FIG. 1, a film-type touch screen panel includes sensing electrodes 12 and outside wirings 13 connected to the sensing electrodes 12 that are formed on at least one surface of a transparent film substrate 10. The film substrate 10 is divided into a touch active region, in which the sensing electrodes 12 are disposed, to recognize touch inputs and a touch non-active region, in which the outside wirings 13 are disposed, as a dead space region at the outside of the touch active region.

In this configuration, the sensing electrodes 12, which are arranged to be alternately positioned in the touch active region of the film substrate 10, include a plurality of first sensing electrodes 12a that are connected in a plurality of line units along the first direction (for example, X-axis direction) for detecting coordinates of touch input and a plurality of second sensing electrodes 12b that are connected in a plurality of line units along a second direction (for example, Y-axis direction) crossing with the first direction.

In the exemplary embodiment shown in FIG. 1, the case where the first sensing electrodes 12a and the second sensing electrodes 12b are formed on both surfaces (e.g., the front face and the back face) of the film substrate 10 will be described as an example.

In addition, the sensing electrodes 12 are electrically connected to the plurality of outside wirings 13 formed at the touch non-active region. As shown in FIG. 1, the outside wirings 13a connected to the first sensing electrodes 12a are formed at the left and right portions of the touch non-active region.

In this case, the width and interval of the outside wirings 13a are about 100 μm and 100 μm, respectively. When the first sensing electrodes 12a are formed to have 20 channels (e.g., 20 lines), and even though the outside wirings 13a at the touch non-active region are formed to have 10 separate channels at the left and right sides, respectively, the width of the touch non-active region still reaches about 2 mm, such that the dead space is considerably increased.

An exemplary embodiment of the present invention illustrates a structure to overcome the above-mentioned disadvantages.

Figure 2:
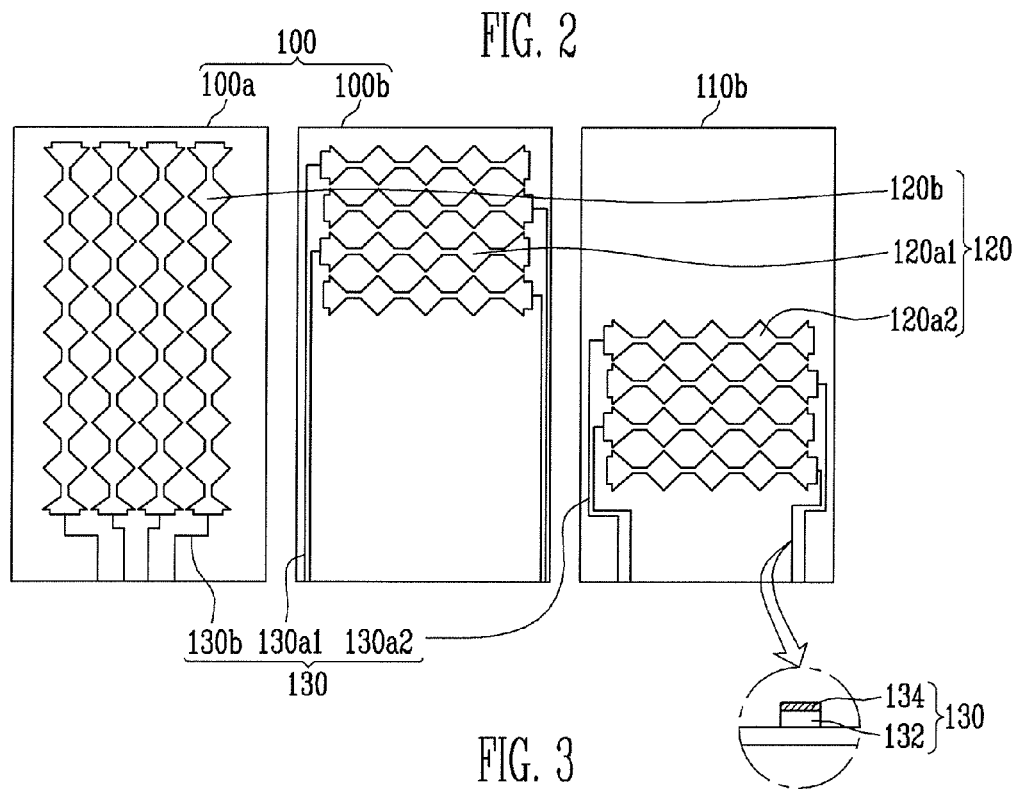
FIG. 2 is a schematic plan view showing a structure of a touch screen panel according to an exemplary embodiment of the present invention.
Figure 3:
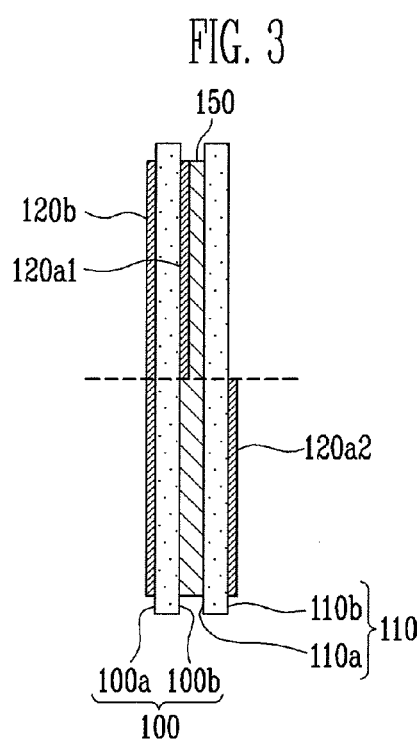
FIG. 3 is a schematic side view of the touch screen panel shown in FIG. 2.

FIG. 2 is a schematic plan view showing a structure of a touch screen panel according to an exemplary embodiment of the present invention, and FIG. 3 is a schematic side view of the touch screen panel shown in FIG. 2.

Referring first to FIG. 2, in the touch screen panel according to the exemplary embodiment of the present invention, sensing electrodes 120 and outside wirings 130 are formed on two sheets of transparent substrates 100 and 110.

In particular, in the exemplary embodiment shown in FIG. 2, the first sensing electrodes 120a1 and 120a2 among the sensing electrodes 120 and the outside wirings 130a1 and 130a2 connected to the first sensing electrodes are separately formed on two different sheets of transparent substrates 100 and 110, thereby making it possible to reduce the dead space region by half, as compared to the related art, while maintaining the interval between the outside wirings 130a1 and 130a2.

In more detail, the substrates 100 and 110 may be formed of a transparent film substrate that has high transparency, has high heat resistance, is processed at high temperature, and does not generate oligomer. For example, the substrates 100 and 110 may be formed of a cyclo olefin polymer (hereinafter, referred to as COP) substrate. However, the substrates 100 and 110 of the present invention are not necessarily limited to the COP substrate. Therefore, any suitable transparent substrates may be applied as the substrates 100 and 110 according to embodiments of the present invention.

The touch active region, in which the sensing electrodes 120 are disposed to recognize the touch input, and the touch non-active region in which the outside wirings 130 are disposed as the dead space region outside the touch active region, are defined on the substrates 100 and 110.

The sensing electrodes 120 are arranged to be alternately positioned in the touch active region of the substrates 100 and 110 and are implemented as a transparent electrode pattern, such as an ITO or IZO pattern, so as to transmit light from a lower display panel.

In addition, the outside wirings 130 are disposed in the touch non-active region, which is referred to as the dead space, and are connected to the sensing electrodes 120 along the first direction or the second direction. For example, each outside wiring 130 may be connected to and formed on the same plane with the sensing electrodes 120 in a plurality of line units that are arranged in the first direction or the second direction.

The sensing electrodes 120 include a plurality of first sensing electrodes 120a1 and 120a2 connected in a plurality of line units along the first direction (for example, X-axis direction) for detecting coordinates of touch input, and a plurality of second sensing electrodes 120b connected in a plurality of line units along the second direction (for example, Y-axis direction), crossing with the first direction.

In the case of the exemplary embodiment of the present invention shown in FIGS. 2 and 3, the sensing electrodes 120 are formed on a first surface 100a and a second surface 100b of the first substrate 100, and on a second surface 110b of the second substrate 110. A transparent adhesive 150 is formed between the second surface 100b of the first substrate 100 and a first surface 110a of the second substrate 110 in order to bond the first and second substrates 100 and 110 together.

As an example, the second sensing electrodes 120b are disposed on the first surface 100a of the first substrate 100, and the first sensing electrodes 120a1 and 120a2 are disposed on the second surface 100b of the first substrate 100 and the second surface 110b of the second substrate 110, respectively. As a result, the touch screen panel according to the exemplary embodiment of the present invention may be implemented as a touch screen panel of two sheets of dual film type.

That is, in the case of the exemplary embodiment of the present invention, as shown in FIG. 2, the first sensing electrodes 120a1, which are half of the first sensing electrodes 120a, are positioned at the upper region on the second surface 100b of the substrate 100. The outside wirings 130a1, which are half of the outside wirings 130a and are connected to the first sensing electrodes 120a1, are formed on the second surface 100b of the first substrate 100. The first sensing electrodes 120a2 are positioned at the lower region on the second surface 110b of the substrate 110, and the outside wirings 130a2, which are connected to the first sensing electrodes 120a2, are formed on the second surface 110b of the second substrate 110.

In addition, in another exemplary embodiment, the first sensing electrodes 120a1 and the outside wirings 130a1 connected thereto, that are formed on the second surface 100b of the first substrate 100, may be odd numbered lines, and the first sensing electrodes 120a2 and the outside wirings 130a2 connected thereto, that are formed on the second surface 110b of the second substrate 110, may be even numbered lines.

In other words, the exemplary embodiment of the present invention forms the first sensing electrodes 120a and the outside wirings 130a connected thereto on different substrates 100 and 110 by forming half of the first sensing electrodes 120a (e.g., 120a1) at the first region and the other half of the first sensing electrodes 120a (e.g., 120a2) at the second region, such that the dead space region may be reduced, e.g., by half, as compared to the related art, while maintaining the interval between the outside wirings 130a formed at the left and right portions of the touch non-active region.

That is, as an example, when the width and interval of the outside wirings 130a are about 100 μm and 100 μm, respectively, and the first sensing electrodes 120a are formed to have 20 channels (e.g., 20 lines), and even though the outside wirings 130a arranged at the touch non-active region have 10 separate channels at the left and right sides, the width of the non-active region still reaches about 2 mm. However, according to the exemplary embodiment shown in FIGS. 2 and 3, 10 channels of the first sensing electrodes 120a1 are formed on the first substrate 100, and another 10 channels of the first sensing electrodes 120a2 are formed on the second substrate 110. Therefore, when the outside wirings 130a1 and 130a2, which are connected to the first sensing electrodes 120a1 and 120a2, respectively, are formed to have 5 separate channels at the left and right portions of the touch non-active region, the width of the touch non-active region may be reduced, e.g., by half, that is, about 1 mm as compared with the related art, thereby reducing or minimizing the dead space.

In addition, referring to the cross-sectional view of the outside wirings shown in FIG. 2, the outside wirings 130 (e.g., 130a1 and 130a2) according to an exemplary embodiment of the present invention are configured to include a transparent electrode layer 132 and a plating layer 134 formed on the upper portion thereof. That is, the outside wirings 130 may be formed using a plating method.

For example, in a process of fully growing the transparent electrode layer 132 and patterning the transparent electrode layer 132 in order to form the sensing electrodes 120, the transparent electrode layer 132 at the touch non-active region is also patterned corresponding to the outside wirings 130, and then, a plating layer 134 is formed on the transparent electrode layer 132 at the touch non-active region, thereby making it possible to form the outside wirings 130. In addition, after growing the transparent electrode layer 132, it is possible to partially form the plating layer 134 on only the transparent electrode layer 132 in the region, in which the outside wirings 130 are formed, by using a mask, prior to patterning the transparent electrode layer.

In this case, the sensing electrodes 120 (e.g., 120a1, 120a2 or 120b) may be formed of the transparent electrode layer formed on the same layer, which is made of the same material as the transparent electrode layer 132 of the outside wirings 130.

The plating layer 134 of the outside wirings 130 may be made of at least one material selected from the group consisting of silver, copper, nickel, palladium, and alloys thereof. For example, the plating layer 134 may be formed by plating copper and/or an alloy of nickel-gold on the transparent electrode layer 132 at the touch non-active region.

As described above, when the plating layer 134 is formed on the upper portion of the transparent electrode layer 132, the resistance of the outside wirings 130 may be reduced. In particular, when using the plating method, the conductive layer having a thickness of about or approximately 10 to 100 times as compared to the vacuum growth may be easily formed at low cost. Therefore, the wiring width may be reduced, such that the touch screen panel may have high definition and a large display area.

Figure 4:
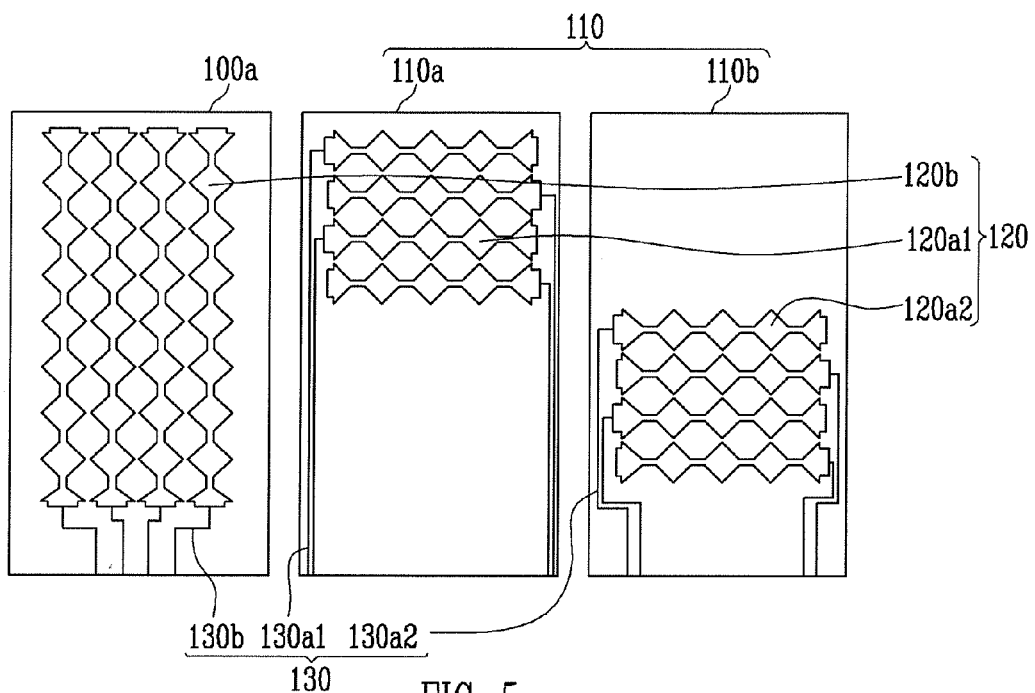
FIG. 4 is a schematic plan view showing a structure of a touch screen panel according to another exemplary embodiment of the present invention.
Figure 5:
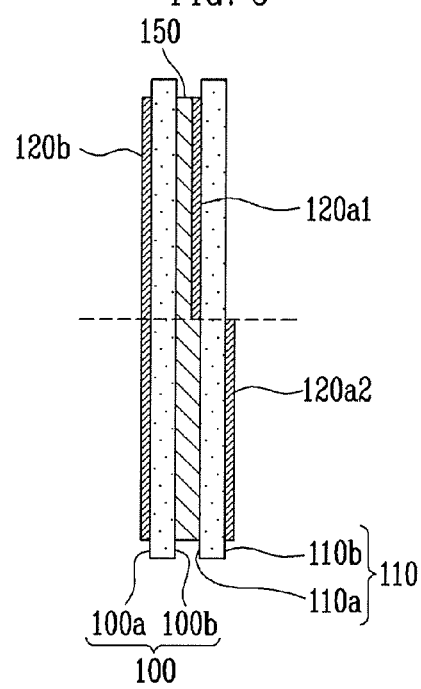
FIG. 5 is a schematic side view of the touch screen panel shown in FIG. 4.

FIG. 4 is a schematic plan view showing a structure of a touch screen panel according to an exemplary embodiment of the present invention, and FIG. 5 is a schematic side view of the touch screen panel shown in FIG. 4.

Comparing the exemplary embodiment of the present invention shown in FIGS. 4 and 5 with the exemplary embodiment shown in FIGS. 2 and 3, they have a difference in that the first sensing electrodes 120a1 and the outside wirings 130a1 formed on the second surface 100b of the first substrate 100 are formed on the first surface 1.10a that is an inner side surface of the second substrate 110.

Therefore, the same components as shown in FIGS. 2 and 3 are denoted with the same reference numerals, and the detailed description thereof will be omitted for the convenience of explanation.

That is, in the case of the exemplary embodiment of the present invention shown in FIGS. 4 and 5, the first sensing electrodes 120a and the outside wirings 130a connected thereto are divided by half and formed on both sides of the substrate 110. However, unlike the exemplary embodiment of the present invention shown in FIGS. 2 and 3, the first sensing electrodes 120a and the outside wirings 130a are each formed on different surfaces of the same substrate (e.g., the second substrate 110). By the above configuration, the dead space region may be reduced by half, as compared to the related art, while maintaining the interval between the outside wirings 130a formed at the left and right portions of the touch non-active region.

Figure 6:
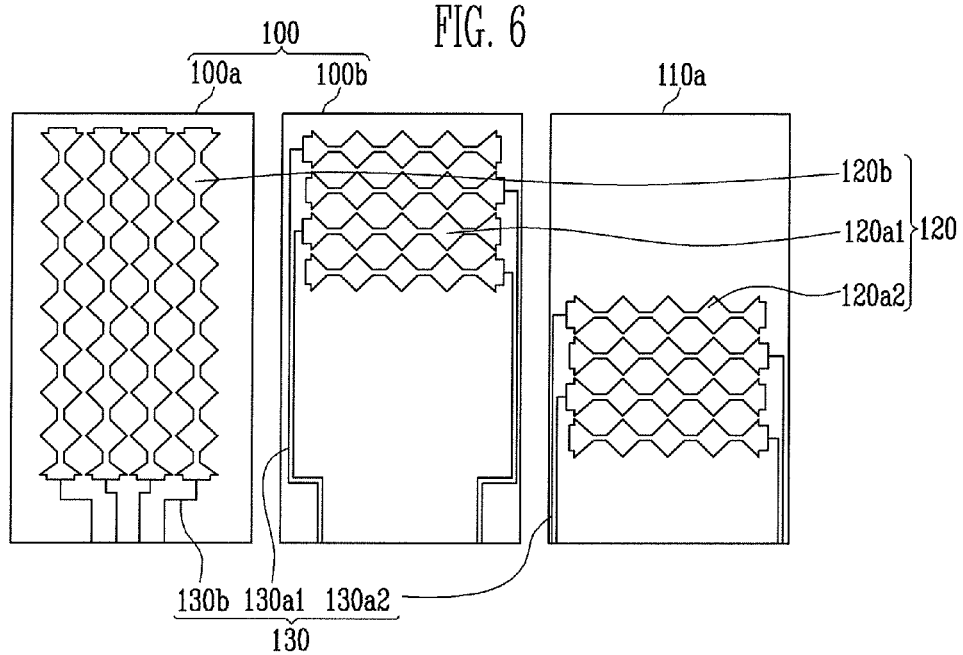
FIG. 6 is a schematic plan view showing a structure of a touch screen panel according to another exemplary embodiment of the present invention.
Figure 7:
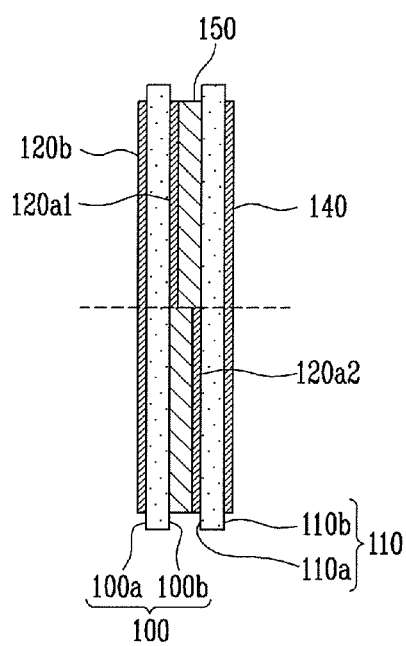
FIG. 7 is a schematic side view of the touch screen panel shown in FIG. 6.

FIG. 6 is a schematic plan view showing a structure of a touch screen panel according to an exemplary embodiment of the present invention, and FIG. 7 is a schematic side view of the touch screen panel shown in FIG. 6.

Comparing the exemplary embodiment of the present invention shown in FIGS. 6 and 7 with the exemplary embodiment shown in FIGS. 2 and 3, they have a difference in that the first sensing electrodes 120a2 and the outside wirings 130a2 formed on the second surface 110b of the second substrate 110, in FIG. 2, are formed on the first surface 110a, in FIG. 6, that is an inner side surface of the second substrate 110, and a transparent ground electrode layer 140 is formed on the second surface 110b of the second substrate 110.

Therefore, the same components as shown in FIGS. 2 and 3 are denoted with the same reference numerals, and the detailed description thereof will be omitted for the convenience of explanation.

That is, in the case of the exemplary embodiment of the present invention shown in FIGS. 6 and 7, the first sensing electrodes 120a (e.g., 120a1 and 120a2) and the outside wirings 130a (e.g., 130a1 and 130a2) connected thereto are divided by half and formed on different substrates 100 and 110. By the above configuration, the dead space region may be reduced, e.g., by half, as compared to the related art, while maintaining the interval between the outside wirings 130a formed at the left and right portions of the touch non-active region.

However, in the case of the exemplary embodiment of the present invention as shown in FIG. 7, the transparent ground electrode layer 140 is further formed on the second surface 110b that is the outer side surface of the second substrate 110. The transparent ground electrode layer 140 may be used to secure the stability between the touch screen panel and the display panel, etc., and may be used to form the capacitance with the sensing electrodes 120 according to the design scheme of the touch screen panel.

That is, in the capacitive-type touch screen panel, the capacitance between the first sensing electrode 120a and the second sensing electrode 120b may be used in order to sense the touched positions or the capacitance between the first and second sensing patterns 120a and 120b and the transparent ground electrode layer 140 may be used. However, this may be variously modified in other embodiments of the present invention.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
   first and second substrates each being divided into a touch active region and a touch non-active region located outside the touch active region;
   a plurality of second sensing electrodes at the touch active region on a first surface of the first substrate;
   a plurality of first sensing electrodes divided into at least two groups, each of the at least two groups being at a respective one of the touch active regions of different surfaces of the first and second substrates, a group of the at least two groups being on a second surface of the first substrate or at least one surface of the second substrate; and
   outside wirings electrically connected to the first and second sensing electrodes,
   wherein respective ones of the outside wirings are electrically connected to, and are at a same surface as, corresponding ones of the sensing electrodes.

2. The touch screen panel according to claim 1, wherein the first sensing electrodes and the outside wirings electrically connected to the first sensing electrodes are divided into a first group at a first region and a second group at a second region.

3. The touch screen panel according to claim 2, wherein a first half of the first sensing electrodes and a first half of the outside wirings electrically connected to the first half of the first sensing electrodes are at the first region, and a second half of the first sensing electrodes and a second half of the outside wirings electrically connected to the second half of the first sensing electrodes are at the second region.

4. The touch screen panel according to claim 2, wherein the first group of the first sensing electrodes at the first region and the first group of the outside wirings electrically connected to the first group of the first sensing electrodes are on the second surface of the first substrate, and the second group of the first sensing electrodes at the second region and the second group of the outside wirings electrically connected to the second group of the first sensing electrodes are on one surface of the second substrate.

5. The touch screen panel according to claim 4, wherein the one surface of the second substrate is an outer side surface of the second substrate.

6. The touch screen panel according to claim 4, wherein the one surface of the second substrate is an inner side surface of the second substrate, and the touch screen panel further comprising a transparent ground electrode layer on an outer side surface of the second substrate opposite the inner side surface thereof.

7. The touch screen panel according to claim 2, wherein the first group of the first sensing electrodes at the first region and the first group of the outside wirings electrically connected to the first group of the first sensing electrodes are on a first surface of the second substrate, and the second group of the first sensing electrodes at the second region and the second group of the outside wirings electrically connected to the second group of the first sensing electrodes are on a second surface of the second substrate.

8. The touch screen panel according to claim 1, further comprising a transparent adhesive between the second surface of the first substrate and a first surface of the second substrate to bond the first and second substrates to each other.

9. The touch screen panel according to claim 1, wherein the outside wirings comprise a transparent electrode layer and a plating film on the transparent electrode layer.

10. The touch screen panel according to claim 9, wherein the first and second sensing electrodes each comprise a transparent electrode layer that is at a same layer as, and comprises a same material as, the transparent electrode layer of the outside wirings to which the first and second sensing electrodes are respectively electrically connected.

11. The touch screen panel according to claim 9, wherein the plating film comprises at least one material selected from the group consisting of copper, nickel, gold, silver, palladium, and alloys thereof.

12. The touch screen panel according to claim 1, wherein the first sensing electrodes are electrically connected to one another in a plurality of line units in a first direction, and the second sensing electrodes are electrically connected in a plurality of line units in a second direction crossing the first direction.

13. The touch screen panel according to claim 1, wherein the first and second substrates comprise a film substrate.

14. The touch screen panel according to claim 13, wherein the film substrate is a cyclo olefin polymer (COP) substrate.

\* \* \* \* \*